United States Patent [19]

Caulfield

[11] Patent Number: 4,922,467
[45] Date of Patent: May 1, 1990

[54] ACOUSTIC DETECTION APPARATUS

[76] Inventor: David D. Caulfield, 193 East Whitecroft, Sherwood Park, Alberta, Canada, T8B 1B7

[21] Appl. No.: 327,720

[22] Filed: Mar. 23, 1989

[51] Int. Cl.$^5$ ............................................. G01S 15/00
[52] U.S. Cl. ...................................... 367/87; 367/135
[58] Field of Search ................. 367/87, 118, 124, 135, 367/136

[56] References Cited

U.S. PATENT DOCUMENTS

| | | | |
|---|---|---|---|
| 3,050,626 | 8/1962 | Dukes et al. | 378/51 |
| 3,611,277 | 10/1971 | Yoder | 367/135 |
| 3,655,937 | 4/1972 | Campbell | 378/54 |
| 3,675,472 | 7/1972 | Kay et al. | 367/11 |

Primary Examiner—Thomas H. Tarcza
Assistant Examiner—Daniel T. Pihulic
Attorney, Agent, or Firm—John A. Baker

[57] ABSTRACT

The present invention relates to an apparatus for use in detecting the substance of an object contained within an enclosure. The apparatus is comprised of an acoustic transmitter for transmitting a pulse of acoustic energy at a first side of the enclosure. A first acoustic receiver is provided for receiving acoustic energy reflected from the object to produce a reflected acoustic energy signal. A second acoustic receiver is provided for receiving acoustic energy which has been transmitted or refracted through the object to produce a transmitted acoustic energy signal. A signal processor is connected to the transmitter and to said first and second receivers. The signal processor processes the transmitted pulse of acoustic energy, the reflected acoustic energy signal and the transmitted acoustic energy signal to produce an object signature indicative of the object. A comparator is provided for comparing the object signature with the signature of known objects to determine the substance of the object. In accordance with the present invention, "enclosure" is defined as being a hollow box like structure having an object to be detected and identified with respect to its substance located therein, for example, a suitcase containing and object, or a quantity of material having an object to be detected and identified with respect to its substance buried therein, for example, an object buried in the earth relatively close to the surface.

15 Claims, 5 Drawing Sheets

ACOUSTIC DETECTION APPARATUS

The present invention relates to an apparatus for detecting the type of material of an object located within an enclosure. More particularly, the present invention relates to an apparatus which generates and transmits an acoustic signal, in the form of pulses, at an object located within an enclosure. The reflected and transmitted or refracted acoustic signals are detected and analyzed with respect to time and their energy content. From this analysis, the acoustic impedance, the acoustic absorption and the sound velocity characteristics of the object can be measured and computed. From these parameters the density, bulk modulus, porosity, and other acoustic mechanical properties of the object can be calculated. These parameters are then compared with a table of like parameters of known substances and a match is obtained. From this match, the type of substance making up the object which is enclosed can be determined to a high degree of accuracy.

In accordance with the present invention, "enclosure" is defined as being a hollow box like structure having an object to be detected and identified with respect to its substance located therein, for example, a suitcase containing and object, or a quantity of material having an object to be detected and identified with respect to its substance buried therein, for example, an object buried in the earth relatively close to the surface.

Accordingly, one embodiment of the present invention is an apparatus for identifying the substance of an object located within a suitcase and another embodiment of the present invention is an apparatus for detecting and identifying the substance of an object buried in the earth.

In the first mentioned embodiment an array of such devices can be set up vertically and a suitcase can be passed on a horizontally moving conveyor past the devices in order to map the interior of the suitcase. Known methods of detecting the contents of suitcases and the like use X-ray scanning or chemical sniffing. These techniques have drawbacks in some applications. In the case of X-ray scanning techniques, an operator and/or computer must observe the results of the scan and make a determination is to the contents of the suitcase from an image alone. In some instances this is difficult because many substances that are particularly important to detect have varying degrees of transparency to X-rays. This makes it very difficult to determine some particular contents exactly, resulting in the need for an on the spot visual search. The present invention provides a more positive result thereby reducing the need for a large volume of spot visual searches. Since the readout is positive, the visual search can be more discretely carried out in a secure area and the possible danger to the searcher and bystanders is reduced.

Chemical sniffing only detects certain objects and it is sometimes possible to mask these objects if one knows that the objects will be subjected to chemical sniffing.

One marked advantage of the present invention is that once it becomes known that objects like explosives and drugs are easily and always detected by the apparatus of the present invention, and that it is not possible to mask the contents in a suitcase in any way, such objects will not be placed in suitcases and the safety of the travelling public will be enhanced.

It has been known for some time to measure the acoustic waves bounced of the ocean bottom in order to determine the type of material that makes up the ocean floor. These techniques have been added to and enhanced in order to produce a detecting apparatus of the present invention.

The present invention also deals with an acoustic sensor for receiving the reflected and transmitted or refracted acoustic signals that improves the signal to noise ratio of the received signal.

This inventive technique can employ, a laser optical detection system consisting of a laser and a diode receiver. The sensitivity of the diode receiver is linear with respect to the displacement of the received laser beam from some optimum position. The laser is bounced off the surface of the enclosure and onto the receiving diode. The acoustic signal aimed at the enclosure causes the surface of the enclosure to vibrate. This vibration causes the laser beam to hit the detecting diode at small displacements from a steady state position. Since the sensitivity of the diode varies with displacement, the intensity of the received laser beam is modulated by the acoustic signal. The optical detection configuration can consist of other configurations, including optical chopping, interferometers, light modulation techniques, all of which are dependent on the particular targets to be examined.

The device according to the present invention operates vary much like an "acoustic radar". A pulse of known energy is directed at the enclosure enclosing an object to be detected. The reflected signal is received from the surface of the enclosure and its intensity is analyzed with respect to time. The received signal will also be in the form of a pulse. The beginning of the pulse will be the signal reflected from the surface of the enclosure. As the period of the pulse progresses the instantaneous magnitude will be a property of boundaries of objects reflecting the signal from deeper and deeper within the enclosure. The "windows" of time within the pulse are analyzed with respect to the intensity or energy of the signal received and this data is processed to determine the acoustic impedance of the material making up the boundary.

A similar detector located on a side of the enclosure opposite the transmitter, receives a signal which has been transmitted or refracted right through the enclosure and objects within the enclosure. This signal is also analyzed with respect to time and energy content. Acoustic absorption and velocity parameters are determined.

The "signature" of the substance within the enclosure is then determined and this "signature" is compared with computer stored signatures of known substances to produce a match. The output to the operator can be a printout or a typed display listing the substances detected. For the sake of simplicity the program that makes the comparison and produces the display can be tailored to the needs of the operator. For instance, in an airport environment the program can be set to print out only controlled substances not permitted within an aircraft. Such controlled substances are, of course explosives and drugs.

According to the second embodiment of the invention it is not possible to locate the receiver receiving the transmitted or refracted signal on the other side of the object to be detected since that object is buried in the earth, or the like. In this embodiment it is recognized that the refracted signal, i.e. the signal refracted by virtue of it travelling through an interface between two objects having differing acoustical impedances, will travel for a distance in a direction approximately perpendicular to the direction of the original signal and then be detectable on the same side of the object on which the transmitter is located. As a result, in the second embodiment the transmitting unit, the receiving unit for receiving the reflected signal and the receiving unit for receiving the refracted or transmitted signal are all on the same side of the object to be detected. The receiving unit which receives the refracted or transmitted signal is spaced a further distance away from the transmitting unit than the receiver which receives the reflected signal.

In accordance with one aspect of the present invention there is provided an apparatus for use in detecting the substance of an object contained within an enclosure, said apparatus comprising: acoustic transmitter means for transmitting a pulse of acoustic energy at a first side of said enclosure; first acoustic receiver means for receiving acoustic energy reflected from the object to produce a reflected acoustic energy signal; second acoustic receiver means for receiving acoustic energy which has been transmitted or refracted through said object to produce a transmitted acoustic energy signal; signal processor means connected to said transmitter means and to said first and second receiver means, said signal processor means processing said transmitted pulse of acoustic energy, said reflected acoustic energy signal and said transmitted or refracted acoustic energy signal to produce an object signature indicative of said object; and comparator means for comparing said object signature with the signature of known objects to determine the substance of said object.

In accordance with another aspect of the present invention there is provided an acoustic energy detector for use in receiving acoustic energy causing a surface to vibrate, said detector comprising: a laser for producing a laser beam which is directed at said surface; and a photo diode receiver for receiving said laser beam after it has been reflected from said surface, said photo diode receiver producing a signal having a magnitude which varies with respect to the displacement of said laser beam from a reference position on said photo diode receiver, the signal thereby being a representation of the acoustic energy vibrating said surface.

In accordance with yet another aspect of the present invention there is provided a method of determining the substance of an object located within an enclosure, the method comprising the steps of: applying a pulse of acoustic energy of a known level to a first side of the enclosure and the object in the enclosure; detecting the reflected acoustic energy reflected from a surface of the object to provide a reflected acoustic signal; detecting the transmitted acoustic energy transmitted or refracted through the object to provide a transmitted or refracted acoustic signal; processing said reflected and transmitted or refracted acoustic signals to produce an acoustic signature of the object; and comparing the signature of the object so obtained with signatures of known objects to determine the substance of said object.

The present invention will be discussed in detail with the aid of the accompanying drawings, in which.

Figure 6:
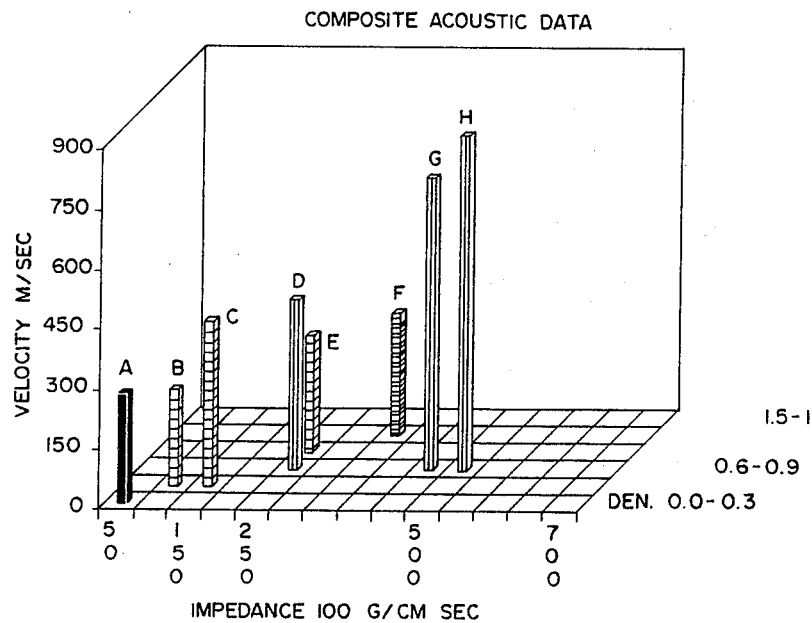
Figure 7:
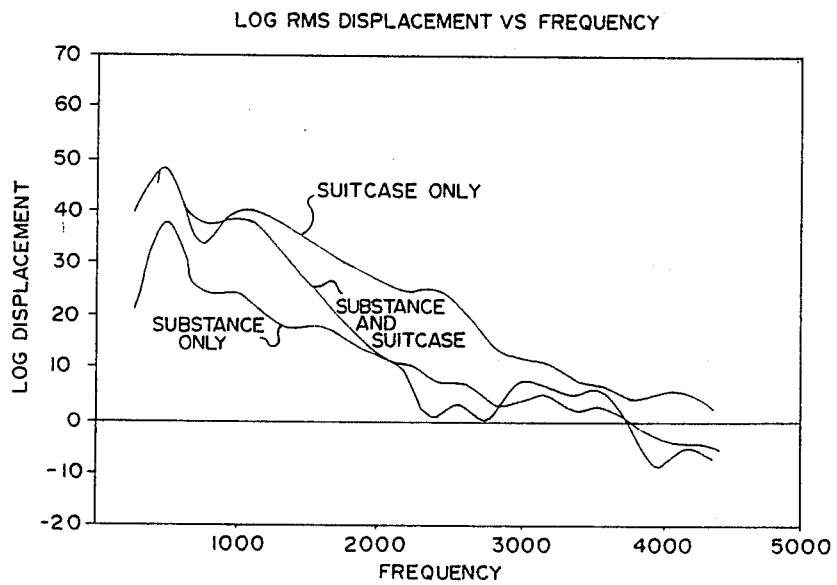

FIG. 6 is a graph showing three acoustic parameters of certain materials plotted for classification. Each column is for a given material type. This figure shows soft to hard materials; and FIG. 7 is a graph correlating frequency and the absorbed displacement for a suitcase, a substance and the suitcase and the substance derived from an apparatus according to the present invention. This graph would be the fourth variable for each bar (substance) shown in FIG. 6.

Figure 1A:
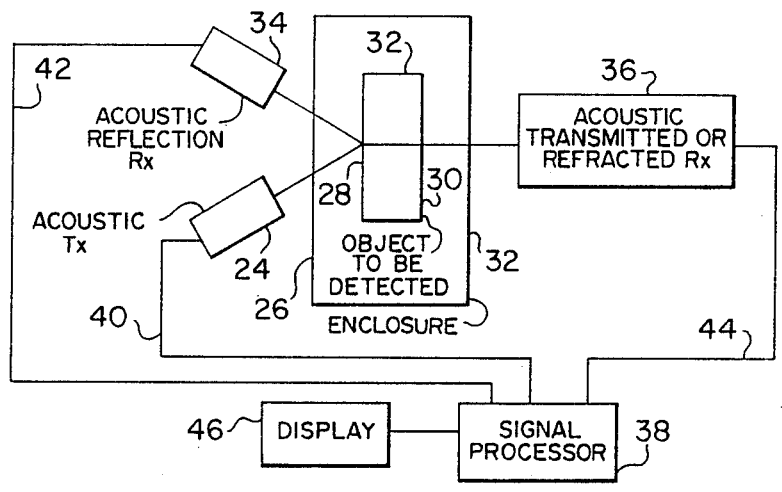
FIGS. 1a and 1b are schematic diagrams of first and second embodiments of present invention, respectively.

With respect to FIG. 1a a suitcase 20 contains an object 22, the substance of which is to be determined. An acoustic transmitter 24 of known type is aimed at a front side 26 of suitcase 20. The transmitter 24 sends an acoustic pulse of known energy at the side 26. Some of the energy of the pulse is reflected off the surface 26 and some of the energy of the pulse penetrates the suitcase and comes into contact with the object 22. Because the object 22 has different acoustic properties than the air within the suitcase, some of the energy of the pulse is reflected off the surface 28 of the object 22. Some of the energy of the pulse is transmitted or refracted through the object 22. Some of this remaining acoustic energy is reflected of the back surface 30 of the object because the back surface is a boundary between objects having differing acoustical impedances. Some of the energy of the transmitted pulse penetrates the back side 32 of The suitcase. The energy of the pulse which is reflected is received by acoustic detector 34, located of the same side of the suitcase 20 as the acoustic transmitter 24. The energy of the pulse that has penetrated the suitcase and the object 22 and has exited the suitcase from side 32 is detected by an acoustic detector 36. The acoustic detector 36 could be placed at the longitudinal sides of the suitcase to detect the refracted energy. In this manner equivalent results and/or multiple detectors 36 could be employed if required by the application.

A signal processor 38 generates a an electrical pulse of energy and sends that pulse on line 40 to acoustical transmitter 24 which converts it into a pulse of acoustical energy. Signal processor 38 generates and stores the electrical parameters such as pulse width and the energy of the electrical pulse fed to acoustic transmitter 24. The received signals from receivers 34 and 36 are sent to signal processor 38 on lines 42 and 44, respectively.

Signal processor 38, which will be discussed in detail below, processes the received signals with respect to the transmitted pulse and determines the acoustic impedance, the acoustic absorbtion and the acoustic velocity of the transmitted signal in the object 22 to determine its acoustic signature. The parameters are further processed to determine the material's density, bulk modulus, porosity, etc., to form when combined with the impedance, velocity and absorbtion an acoustic signature for the object. This signature is then compared to known acoustic signatures stored in processor 38 and the type of substance of object 22 is determined.

This information is then output of display 46 which may be a tv screen of a printer.

Figure 1B:
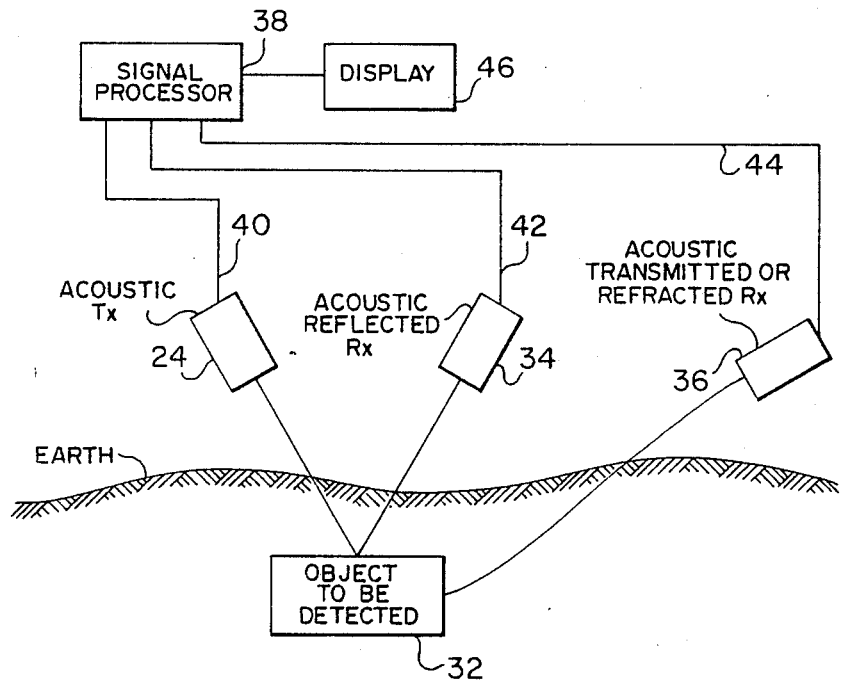

FIG. 1b shows an embodiment of the invention that detects and determines the substance of an object buried in the earth. Signal processor 38 produces an electrical pulse which sent via line 40 and is converted into an acoustic pulse by acoustic transmitter 24. The acoustic pulse is-aimed at the earth and moved about until display indicates an object. This is occurs when the acoustic pulse penetrates the earth and hits object 32. A portion of the acoustic pulse is reflected from the surface of the object and the reflected signal is received by acoustic reflected signal receiver 34. A portion of the transmitted pulse is refracted by the object 32 and is directed out the side of the object in a direction generally perpendicular to the direction of the transmitted pulse. The a portion of the refracted acoustic signal is received by transmitted or refracted acoustic receiver 36. It must be noted that the two receivers 34 and 36 are above the earth. In order that receiver 36 receive the refracted signal, it is located at a greater horizontal distance from the object than the receiver 34. Receivers 34 and 36 are connected to the signal processor 38 by lines 42 and 44, respectively. The remainder of the operation of this embodiment is the same as that described with respect to FIG. 1a. The actual signal processing will be described below.

Figure 2:
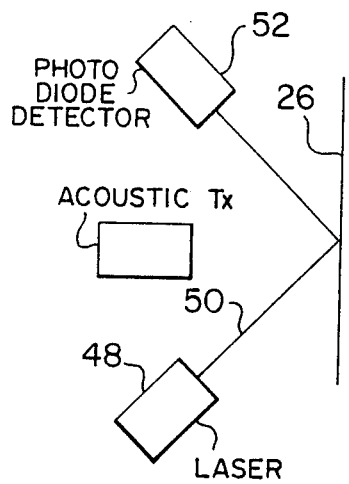
FIG. 2 is a schematic diagram of a laser acoustic receiver according to the present invention.
Figure 3:
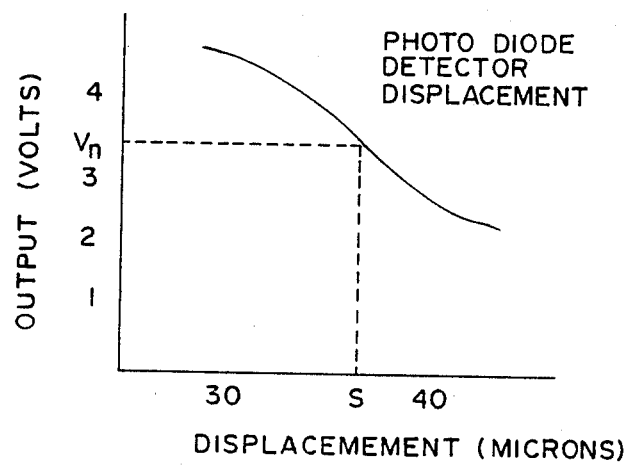
FIG. 3 is a graph of the output vs. displacement of a diode detector used in an embodiment of the present invention.

FIGS. 2 and 3 will now be used to describe an inventive acoustic detection system. A laser 48 produces a beam 50 which impinges on enclosure surface 26. The beam is reflected off the surface 26 and enters an optical detector 52. Detector 52 can be an optical diode which produces a voltage output proportional to the amount of light energy received. FIG. 3 is a graph which shows the output voltage as a function of the received light beam's displacement from some fixed point S. As the beam moves further away from point S in either direction the voltage output varies from Vn. The acoustic pulse transmitted by acoustic transmitter 24 vibrates the surface 26 of the enclosure, directly. Acoustic energy reflected from the surface of an object within the enclosure will also vibrate the surface 26 of the enclosure. The vibration of the surface 26 moves the point of contact of the laser beam on the surface of the enclosure and thereby moves the point of beam impingement of the laser beam on the photo diode in laser detector 52. The voltage at the output of the detector 52 will vary in accordance With the vibrations of the surface 26. It has been found that such an arrangement allows for the detection of very small signals while maintaining a good signal to noise ratio.

The receivers 34 and 36 can be of the laser type described above or they can be known microphones or geophones.

Figure 4:
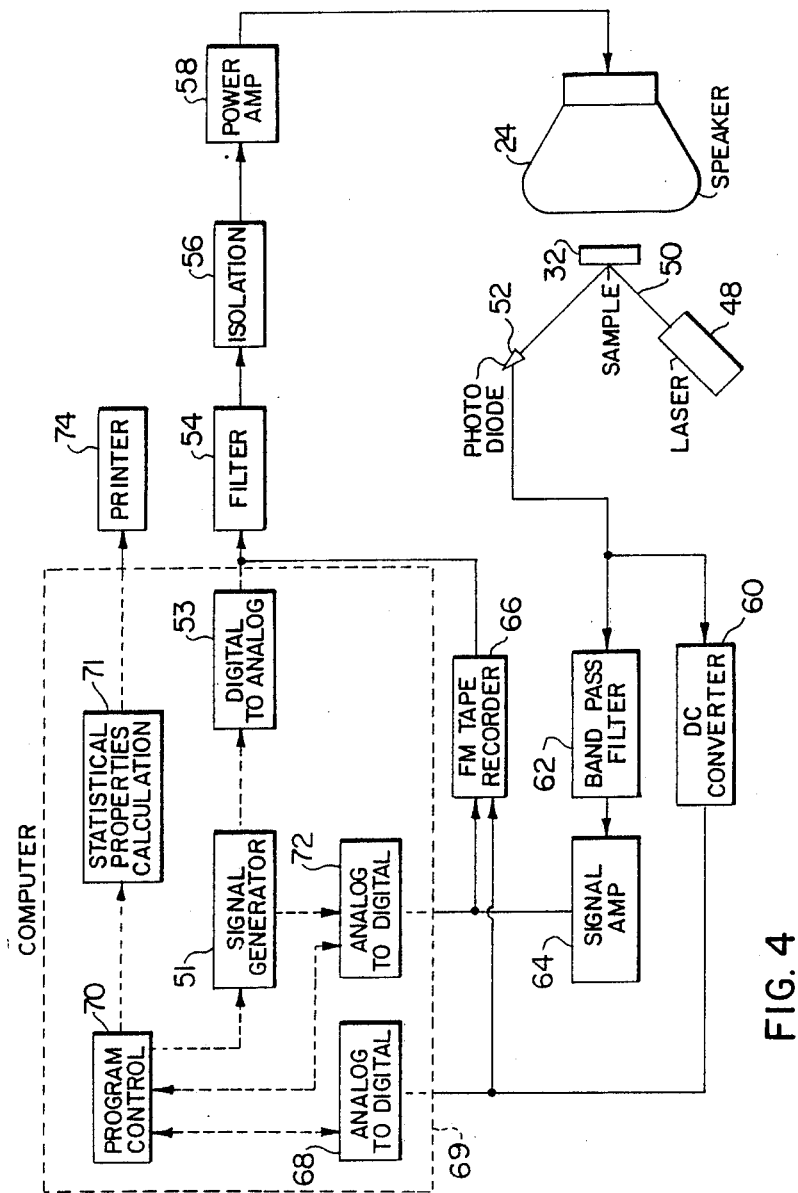
FIG. 4 is a block diagram of a system of the present invention.

A typical system block diagram of the present invention is shown in FIG. 4. For the sake of simplicity FIG. 4 is shown with only one receiver. The receiver comprises laser 48, beam 50 and photo diode 52. The beam 50 is reflected off an object 32, the substance of which is to be determined, onto photo diode 52. The single receiver shown in FIG. 4 is pulsed by an acoustic transmitter or speaker 24. The acoustic pulse transmitted is generated by an equivalent electrical signal which is digitally produced by signal generator 51. The digital signal is converted into an analog signal by digital to analog converter 53 and is shaped and fed to speaker 24 by filter 54, isolator 56 and power amplifier 58.

The received signal is first detected by a dc converter 60 that measures the average level of the diode output for calibration purposes. The same received signal is also fed through a band pass filter 62 and a signal amplifier 64 to obtain a signal having a good signal to noise ratio. The resulting signal can be recorded for further processing in an fm tape recorder 66. That recorder also records the received dc signal level from dc converter 60 and the parameters of the transmitted pulse from digital to analog converter 53.

The received dc signal level is fed to a computer 69 where it is then digitalized by analog to digital converter 68 and used by program control shown generally in FIG. 4 as block 70. Similarly, the amplified received signal is fed to the computer 69 where it is also digitalized by analog to digital converter 72. The digital result is also fed to the program control block 70. Program control then processes the received data to produce the object signature. This is pictured in FIG. 4 at block identified as statistical properties calculation. It should be realized that the reflected received signal is processed in exactly the same manner and is fed to block 71. The results of the calculations carried out in block 71 are printed on a printer 74. Device 74 could be some other display device.

Figure 5:
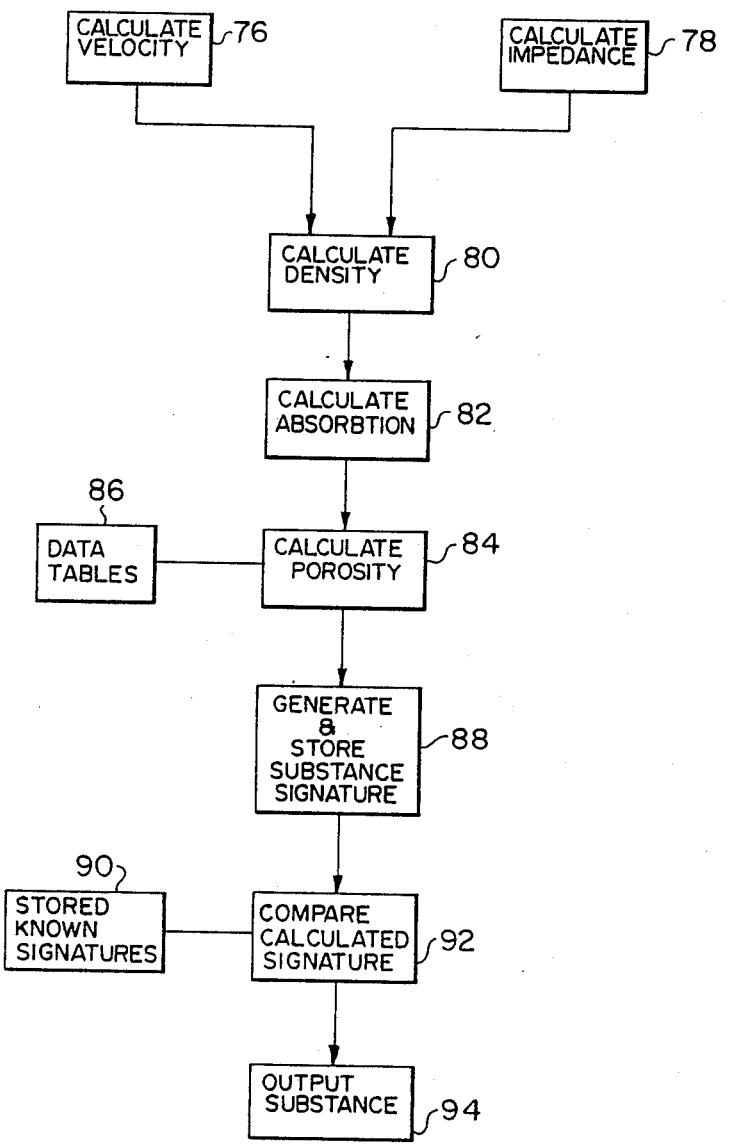
FIG. 5 is a flow chart showing the steps taken in the signal processing done to derive the acoustic parameters and hence the material signature.

FIG. 5 is a flow chart which shows the operation of block 72.

The velocity of the acoustic wave is calculated at block 76. This is done by measuring the travel time from transmit to receive on each receiver and from each reflected interface of objects within the enclosure and observing velocity c.

The acoustic impedance of the object is calculated in block 78. The displacement Y of the object or the side of the enclosure is measured using, for example the laser-optical diode embodiment described with reference to FIGS. 2 and 3. The energy of the acoustic pulse is known and the incident pressure p of the acoustic pulse on the object can be determined. If the object is inside and enclosure this operation will have to be taken in steps. First the pressure at the interface of the side of the enclosure is determined. Other parameters are then calculated for the enclosure and these parameters will be used to calculated the effect of the enclosure on the incident pressure on the next object interface within the enclosure. That next interface may be with the object under test. The pulse of acoustic energy has a frequency f which is known. The acoustic impedance Z is then determined, where $Z = p/(2\pi fY)$.

Object density is calculated in block 80, by merely dividing the impedance by the velocity.

Absorbtion is then calculated in block 82. Knowing the source pressure p at each interface and knowing the impedance at each interface allows calculation of signal level without absorbtion. A comparison of the signal at more than one receiver allows for an estimation of signal loss due to absorbtion. In other words the absorbtion is computed by noting the level of energy travelling through a given object and by comparing this to the true amount that should have travelled through given the impedance differences at the interface of the object.

Finally, the porosity of the object is determined at block 84 by comparing from tables stored in memory 86. Memory 86 stores empirical tables relating density, absorbtion and velocity with porosity.

The above calculated material parameters make up the signature of the object and this data is stored in block 88. Correlations of known substances are stored in memory 90. Comparator 92 matches the substance signature stored at block 88 with the table of signatures stored in memory 90 to produce an output identifying the substance. The substance is then displayed on some output device as for example printer 94.

FIG. 6 illustrates various typical materials A, B, C, D, E, F, G, and H ranging from hard materials to soft materials. Each material has a unique velocity (vertical bar) for each density and acoustic impedance. For each one of these bars there is an absorbtion curve as is discussed below with respect to FIG. 7. Practical use of this technique requires the removal of the effect of the suitcase wall which is also discussed with respect to FIG. 7.

FIG. 7 shows the results of an experiment which was used to test the usable frequencies and also to obtain a correlation for an absorbed acoustic signal of a suitcase that is empty, a substance only and a substance enclosed in a suitcase.

The axes of the graph shown in FIG. 7 are calibrated as the log of the displacement of the laser beam described in FIGS. 2 and 3 versus the frequency. It can be seen that in the frequency range from 2000 to 4000 cycles there is good correlation and that is the suitcase signal is subtracted from the suitcase-substance signal a close correlation to the substance alone signal is obtained. This shows that it is possible to determine certain properties of a substance located within an enclosure using the technique of the present invention.

The embodiments of the invention in which an exclusive property or privilege is claimed are defined as follows:

1. An apparatus for use in detecting the substance of an object contained within an enclosure, said apparatus comprising:
   acoustic transmitter means for transmitting a pulse of acoustic energy at a first side of said enclosure;
   first acoustic receiver means for receiving acoustic energy reflected from the object to produce a reflected acoustic energy signal;
   second acoustic receiver means for receiving acoustic energy which has been transmitted or refracted through said object to produce a transmitted or refracted acoustic energy signal;
   signal processor means connected to said transmitter means and to said first and second receiver means, said signal processor means processing said transmitted pulse of acoustic energy, said reflected acoustic energy signal and said transmitted or refracted acoustic energy signal to produce an object signature indicative of said object; and
   comparator means for comparing said object signature with the signature of known objects to determine the substance of said object.

2. The apparatus of claim 1, further including display means for providing an indication of the substance of the object.

3. The apparatus of claim 2, wherein said enclosure is a box and wherein said first receiver means is located on said first side and said second receiver means is located on a side of the box opposite said first side.

4. The apparatus of claim 2, wherein said enclosure is the earth and wherein said first and second receiver means are located on said first side, said second receiver means being spaced further from said transmitter means than said first receiver means.

5. The apparatus of claim 1, 2 or 3, wherein said first and second receiver means are microphones.

6. The apparatus of claim 1, 2 or 3, wherein said first and second receiver means are geophones.

7. The apparatus of claim 3, wherein said first and second receiver means are comprised of;
   a laser for producing a laser beam which is directed at said first side of said enclosure;
   photo diode receiver for receiving said laser beam after it has been reflected from said side of said enclosure, said photo diode receiver producing a signal having a magnitude which varies with respect to the displacement of said laser beam from a reference position on said photo diode receiver.

8. The apparatus of claim 4, wherein said first and second receiver means are comprised of;
   a laser for producing a laser beam which is directed at said side of said enclosure;
   photo diode receiver for receiving said laser beam after it has been reflected from said side of said enclosure, said photo diode receiver producing a signal having a magnitude which varies with respect to the displacement of said laser beam from a reference position on said photo diode receiver.

9. The apparatus of claim 7, wherein said signal processor means processes said reflected acoustic energy signal, said transmitted or refracted acoustic energy signal to produce an acoustic impedance, an acoustic absorbtion, an acoustic velocity and a porosity of said object.

10. The apparatus of claim 8, wherein said signal processor means processes said reflected acoustic energy signal, said transmitted or refracted acoustic energy signal to produce an acoustic impedance, an acoustic absorbtion, an acoustic velocity and a porosity of said object.

11. The apparatus of claim 9 or 10, wherein said signature of said object is derived from the acoustic impedance, absorbtion, velocity and the porosity of said object.

12. A method of determining the substance of an object located within an enclosure, the method comprising the steps of:
   applying a pulse of acoustic energy of a known level to a first side of the enclosure and the object in the enclosure;
   detecting the reflected acoustic energy reflected from a surface of the object to provide a reflected acoustic signal;
   detecting the transmitted or refracted acoustic energy transmitted or refracted through the object to provide a transmitted or refracted acoustic signal;
   processing said reflected and transmitted or refracted acoustic signals to produce an acoustic signature of the object; and
   comparing the signature of the object so obtained with signatures of known objects to determine the substance of said object.

13. The method of claim 9, wherein the step of processing further includes the step of calculating the acoustical impedance of the object, the acoustical absorbtion of the object, the acoustic velocity in the object and the porosity of the object and using the impedance, absorbtion, velocity and porosity to determine the acoustic signature.

14. The method of claim 12 or 13, wherein the enclosure is a box and the reflected acoustic energy is detected on said first side of the enclosure and the transmitted or refracted acoustic energy is detected on a side of the enclosure opposite said first side.

15. The method of claim 12 or 13, wherein the enclosure is the earth and the reflected acoustic energy and the transmitted or refracted acoustic energy are detected on said first side of the enclosure and the transmitted or refracted acoustic energy is detected at a position further away from the object than the reflected acoustic energy is detected.

* * * * *